March 22, 1938.    A. F. LEPPLA ET AL    2,112,032
LUBRICATING SYSTEM
Filed Feb. 20, 1936    4 Sheets-Sheet 1
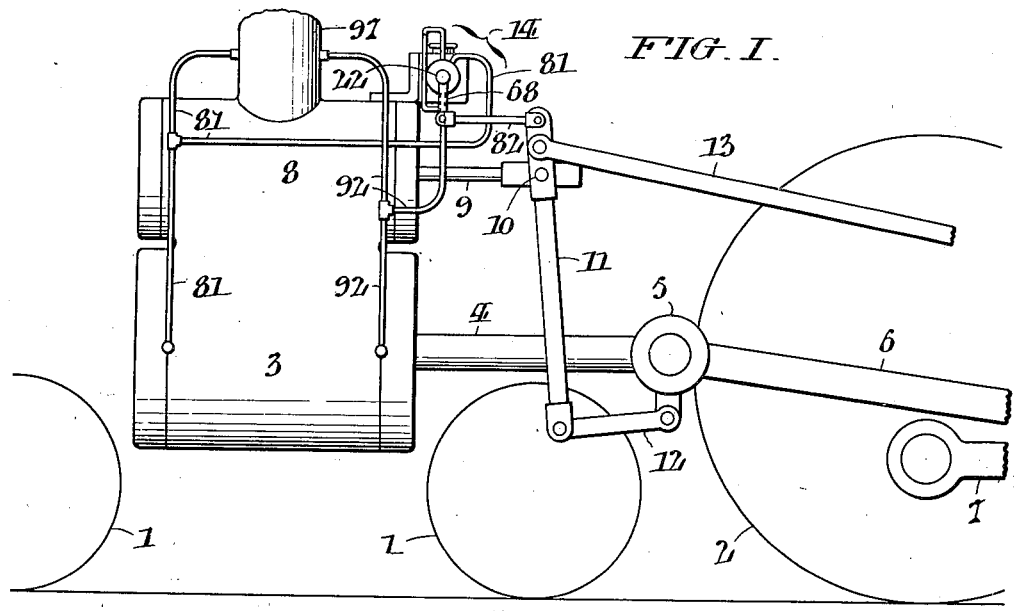
FIG. I.
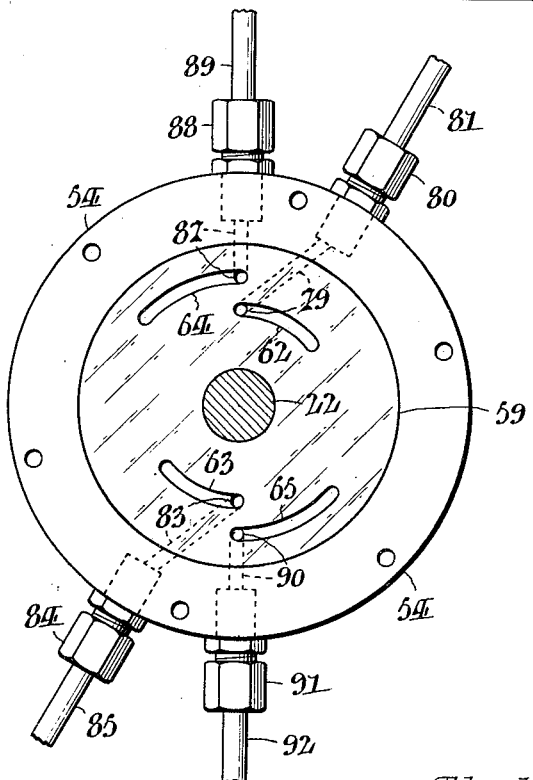
FIG. IV.
WITNESSES:
John A. Weidler
William Bell, Jr.
INVENTORS:
Albert F. Leppla &
BY Erwin G. Mangels,
ATTORNEYS.

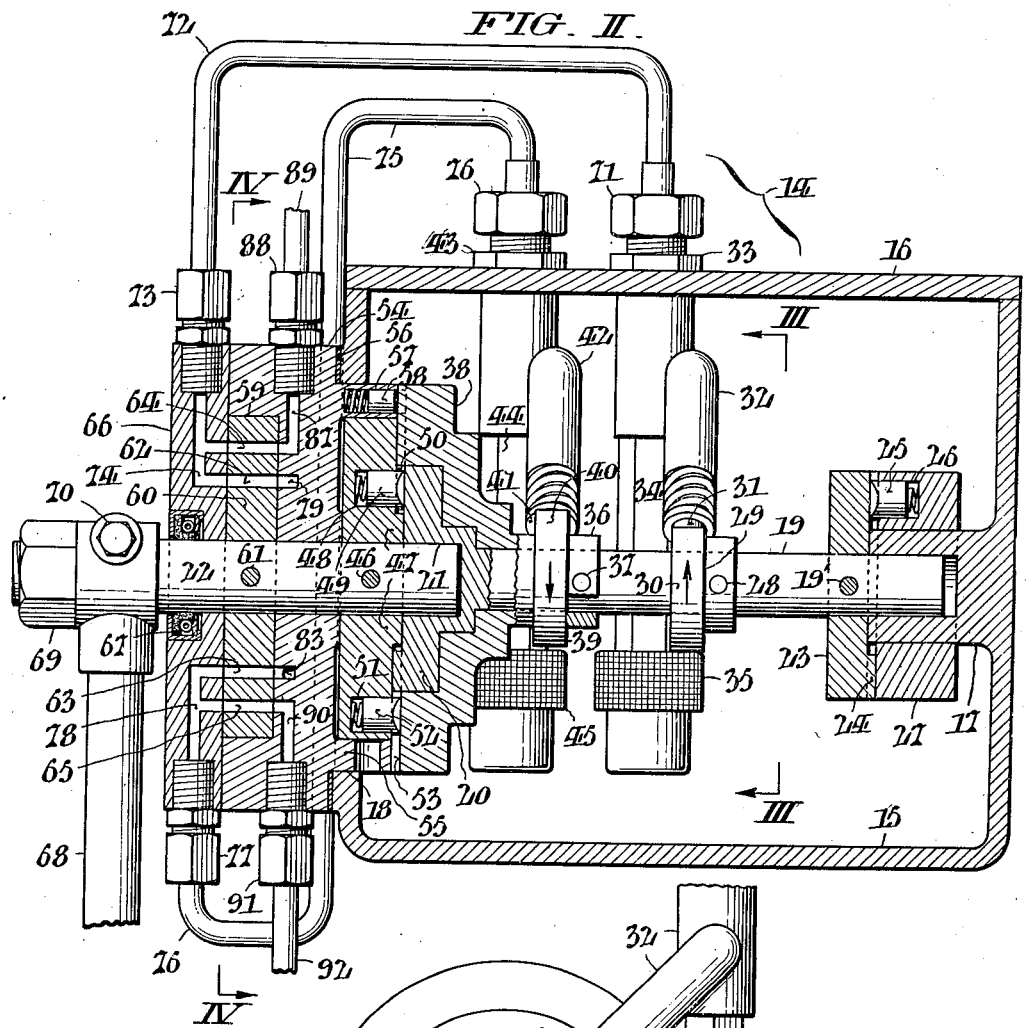

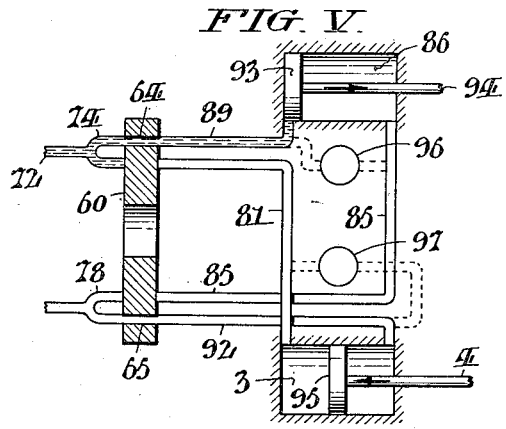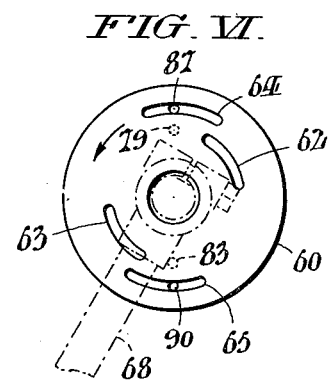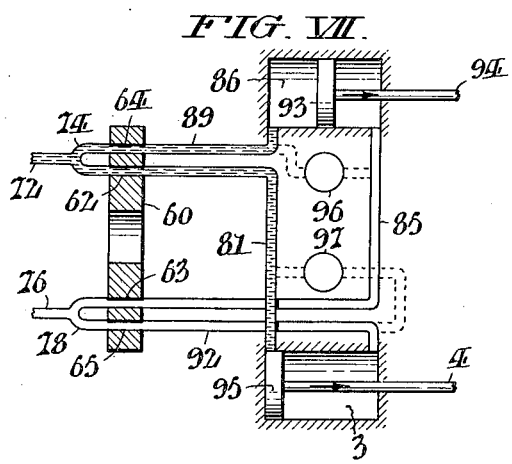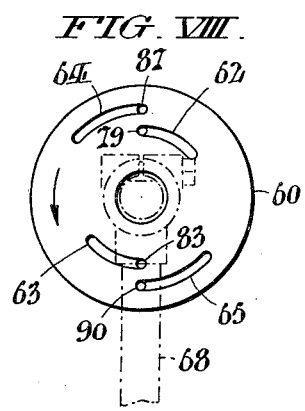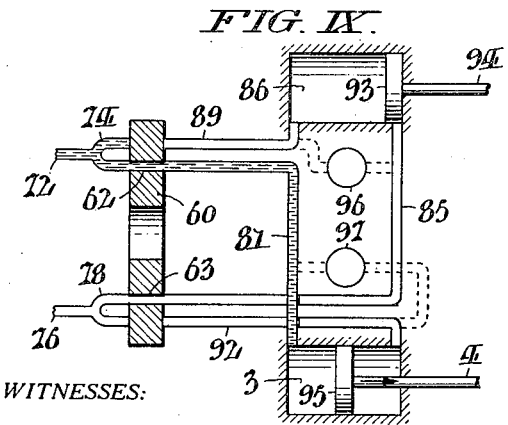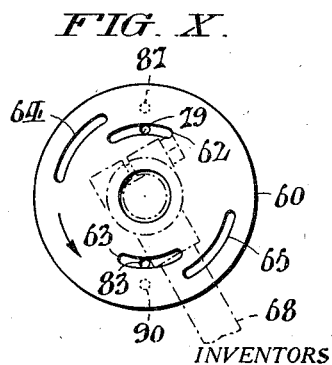

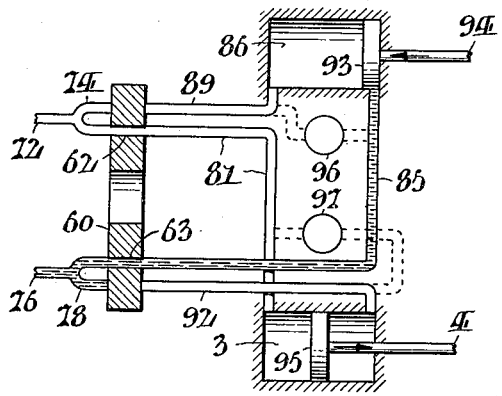
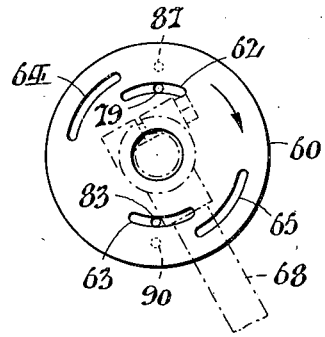
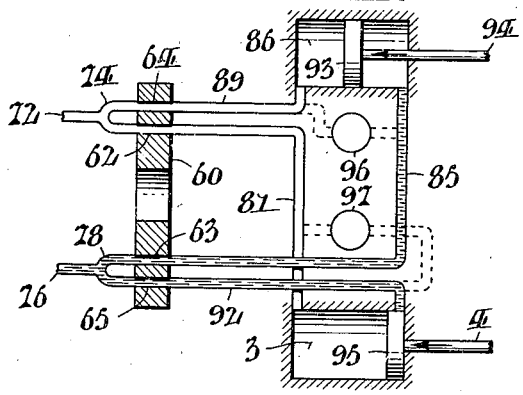
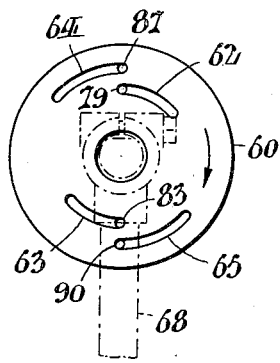
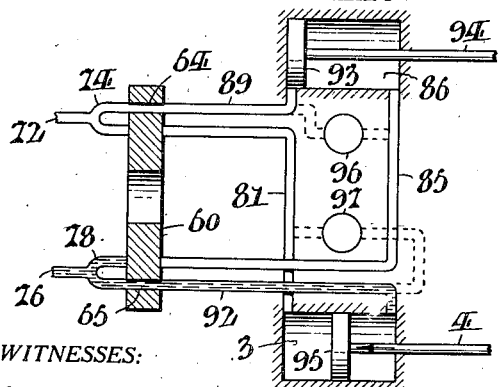
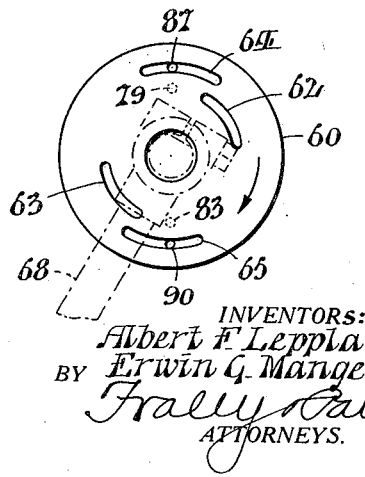

Patented Mar. 22, 1938

2,112,032

UNITED STATES PATENT OFFICE 2,112,032

LUBRICATING SYSTEM

Albert F. Leppla, Rock Island, Ill., and Erwin G. Mangels, Davenport, Iowa

Application February 20, 1936, Serial No. 64,810

5 Claims. (Cl. 184—6)

This invention relates to lubricating systems for supplying lubricant at predetermined pressure and in measured amounts to parts requiring periodic or constant lubrication, and it has more particular reference to systems which are adapted for effecting the lubrication of locomotives, gas engines, steam pipes and so forth.

The primary object of this invention is to provide a novel and more practical, completely controlled, timed-and-distributed lubrication system, preferably, although not essentially, adapted for effecting the positive, regular, and forcible introduction of predetermined quantities of lubricant into the cylinders of locomotives against the steam pressure, gas engines, steam pipes, and many other desirable purposes.

Another object of the invention is the provision of a novel mechanical lubricator including double-acting time-controlled distributing means operated in phase relation from a common actuator element.

A further object is the provision of a novel lubricating means whereby automatic lubrication of the parts involved in the system is effected, in accordance with their needs, without the aid of any auxiliary mechanism.

Other objects and ancillary advantages of this invention are more fully set forth hereinafter, said invention essentially consisting of a lubricating system including reversely actuated force pumps and a distributor operated in common by an element receiving oscillatory movement by virtue of coordination with a reciprocatory member or part of a locomotive, for example.

This invention, furthermore, consists of certain combinations of instrumentalities and features of construction, all of which will be hereinafter disclosed, and more specifically defined in the claims at the conclusion of this specification.

To illustrate the invention, reference will now be made to the accompanying sheets of drawings in which the same reference characters are employed to designate corresponding parts in all the figures.

Fig. I is a fragmentary side elevation of the forward lower portion of a steam locomotive, and illustrating the application to the left-hand cylinder of the novel lubricating system of this invention.

Fig. II is an axial section through the combined lubricator and distributor unit of this invention, and drawn to a considerably larger scale than in the preceding view.

Fig. III is a detail view, taken on the plane designated III—III in Fig. II.

Fig. IV is a view taken on the plane IV—IV in Fig. II.

Figs. V–XVI, inclusive, are successive schematic plural-views illustrating the relation of the engine cylinder pistons of a locomotive with respect to the changing positions of the unit distributor head; and all of which will be hereinafter fully explained.

Referring first to Fig. I of the accompanying drawings, the numeral 1 designates the wheels of a locomotive front bogie, 2 one of the drive wheels, 3 the left-hand cylinder, 4 the associated piston rod having a coupler 5 to the connecting rod 6; and 7 is a fragmentary portion of the associated drive wheel coupling-link. Surmounting the cylinder 3 is the valve chest 8, controlling admission and exhaust of steam to and from said cylinder, and having a valve rod 9 with fulcrum connection at 10 of the rocker arm 11 which, in turn, is operatively coordinated at its lower end by a short link 12 to the coupler aforesaid, and by a rod 13, above the fulcrum 10, to the valve shifting mechanism (not shown) associated with one of the drive wheels 2. All of the foregoing mentioned parts are in accordance with conventional practice, and 14 comprehensively designates the novel pump-distributor unit forming the essential subject-matter of this invention.

The combined pump-distributor unit 14, as best shown in Figs. II–IV, inclusive, comprises a housing or reservoir 15 fitted with a removable cover 16, said housing being provided on one inner face with a projecting bearing 17 and in the opposed wall with an aperture 18. Journaled by one end in the bearing 17 is a cam-shaft 19 which is provided at its other end with a stepped-head 20 having a concentric pilot bearing 21 for reception of the inner end of the drive-shaft 22. Rigidly secured to the cam-shaft 19, adjoining the reservoir bearing 17, as by a pin 19′, is a holding-ratchet 23 having radial teeth 24 for engagement by a spring influenced holding-pawl 25 conveniently housed in a socket bore 26, provided for the purpose in a collar 27 rigidly secured on the bearing 17.

Secured on the cam shaft 19, as by a cotter-pin 28, is a cam 29 having a spiralized "rise" 30 for coaction with the outwardly-influenced plunger 31 of an associated pump 32 clamped to the reservoir cover 16 by a lock nut 33; said pump having a suction extension 34 and skimmer cap 35, in accordance with known practice.

Freely mounted on the cam-shaft 19 intermediate the stepped head 20 and a retaining collar 36, is a sleeve-like ratchet 38 with an integrally-formed cam 39 restrained against longitudinal shifting, relative to the cam shaft 19, by the collar 36 secured on the latter by a pin 37, said cam 39 having a spiralized "rise" 40 directionally-opposed to the previously mentioned cam 29. In the particular embodiment of the invention illustrated the cam 29 has a spirally receding right-hand rise 30, whereas the rise 40 of the cam 39 is left-hand, as indicated by the arrows in Figs. II and III, said cam rises also having high point ends e, e', respectively. The cam 39 coacts with the outwardly-influenced plunger 41 of a second pump 42 clamped to the reservoir cover 16 by a lock nut 43; and said pump is provided with a suction extension 44 and skimmer cap 45, as before described.

Secured on the drive shaft 22 by a pin 46 is a disc 47 having a socket hole 48 housing an outwardly-urged driver pawl 49 coactive with radial teeth 50 in the cam-shaft head 20, to effect rotation of the cam shaft 19; and a second socket hole 51 holding a similarly-influenced driving pawl 52 coactive with radial teeth 53 around the confronting face of the holding ratchet 38.

Rigidly attached to the reservoir 15, by means not shown, is a head block 54, having a cylindrical extension 55 snugly fitting the reservoir aperture 18 with interposition of appropriate leak-proof packing 56; said extension being bored out for reception of the drive disc 47, and having a socket hole 57 housing an outwardly-influenced holding-pawl 58 coactive with the ratchet radial teeth 53, for a purpose later on explained. The outer part of the head block 54 is bored at 59 for reception of a timing disc 60 fixed on the drive shaft by a pin 61, and hereinafter termed the distributor; said distributor being provided with inner and outer arcuately-elongated ports 62 and 63, as well as 64 and 65, respectively. The inner ports 62, 63, it will be observed, are shorter in length than the outer ports 64, 65, and their purpose will be later on disclosed.

Closing in the distributor 60, and suitably secured to the head block 54 and reservoir 15, is a cover member 66 having an inset sealing means 67 to prevent fluid leakage past the drive shaft 22 where it extends outwardly, said shaft having applied thereto an actuator lever 68 which is held in place by a nut 69 and restrained against rotary displacement relative to the shaft 22 by a conventional lock bolt 70. The lever 68 is preferably coordinated with the rocker arm 11, by a short link 82 for actuation thereby as hereinafter explained.

Secured by a union 71 to the pump 32 is a discharge pipe 72, the other extremity whereof is attached, by a coupling nipple 73, to the cover member 66, said pipe having flow-communication by way of a branched passage 74 into the distributor ports 62, 64. Similarly the pump 42 has a discharge pipe 75 connected thereto by a union 76, and to the cover member 66 by a coupling nipple 77, said pipe having flow communication by way of a branched passage 78 into the distributor ports 63, 65. Outlet, from the distributor port 62, is by way of a duct 79 in the head block 54, nipple 80 and delivery pipe 81 to the front end of the left-hand cylinder 3, Figs. V-XVI; or, the alternate position into main steam pipe 97, for example: that from the distributor port 63 by way of a duct 83 in the head block 54, nipple 84 and delivery pipe 85 to the rear end of the right-hand cylinder 86, or the alternate position into main steam pipe 96; that from the distributor port 64 by way of a duct 87 in the head block 54, nipple 88 and delivery pipe 89 to the front end of the right-hand cylinder 86, or the alternate position into main steam pipe 96; and that from the distributor port 65 by way of a duct 90, nipple 91 and delivery pipe 92 to the rear end of the left-hand cylinder 3, or the alternative position into main steam pipe 97.

Having disclosed the structural aspects of the invention, the cylic operation may be briefly described as follows by reference, more particularly, to Figs. V-XVI, inclusive. Assuming the right-hand cylinder piston 93 and rod 94, and the left-hand cylinder piston 95 and rod 4, with the distributor 60 and actuator lever 68, all occupy the positions shown in Figs. V and VI, it will be readily seen that the pump 32 is ready to force lubricant, under coaction of the cam rise 30 with its plunger 31, by way of the discharge pipe 72 and outer branch of the passage 74 through the distributor port 64, duct 87 and pipe 89 for admission into the right-hand cylinder 86, as the piston 93 is moved in the direction of the arrow, on the rod 94, under pressure of the admitted motive medium for its power stroke. Incidentally, it is to be particularly remarked that such admission of lubricant extends during the first half of the piston stroke in either direction, as later on herein amplified, with continuous atomization and distribution within the cylinders 3 and 86, and resultant better lubrication of said cylinders than heretofore attainable.

Operation of the actuating lever 68 by the rocker arm 11, is effected by the conventional reciprocating means hereinbefore referred to, and through the medium of the drive-shaft 22 and ratchet means 49, 50 causes rotary movement of the cam-shaft 19 and cam 29, with concurrent clockwise rotation of said cam and operation of the pump 32 to force lubricant into the discharge pipe 72, while the sleeve-like ratchet 38 is held stationary by the holding-pawl 58, and the plunger 41 of the pump 42 having passed over the high-point end e' of the cam 39 under action of the associated spring. Now, it will be readily seen that, as the lever 68 moves from the position of Fig. VI to that of Fig. VIII, the distributor 60 will be turned by the shaft 22, in the direction of the arrows on said views, so as to bring the inner branch of the passage 74 into flow communication with the distributor port 62, duct 79 and pipe 81 for admission of lubricant to the left-hand cylinder 3, as the piston 95 moves forward in the direction of the arrow on its rod 4, for the first half of the forward stroke. Further movement of the lever 68 to its predetermined limit of oscillation, as shown to the right in Fig. X, turns the distributor port 64 out of communication with the duct 87, but leaves the inner distributor port 62 still in flow communication with the duct 79 during said movement for supply of lubricant by way of the pipe 81 to the cylinder 3, while the piston 93 in the right-hand cylinder 86 completes its forward stroke, as indicated in Fig. IX.

As the lever is moved in a reverse direction, or toward the left, as shown in Figs. XI-XVI, inclusive, under action of the engine rocker arm 11, the cam shaft 19 will be restrained against rotary motion by the holding-ratchet 23 and associated pawl 25, in an obvious manner; whereas the holding-ratchet 38 will be released from retention by the pawl 58, and turned by the pawl 52 of the driving disc 47 in a counter-clockwise direction, as indicated by the arrow on the cam rise 40 in Fig. II. As a result of this movement, the plunger 41 of the pump 42 will be gradually forced inwardly with movement of the distributor 60 in a clockwise direction, as shown by the arrows in Figs. XII, XIV and XVI. Consequent upon movement of the distributor 60 from the position of Fig. XII to that of Fig. XIV, lubricant will be forced through the port 63 and pipe 85 into the right-hand cylinder 86 during its return half-stroke, while lubricant will be forced through the port 65 into the pipe 92 ready for admission into the left-hand cylinder 3 as the piston 95 moves into position ready for its return stroke, as indicated by the arrow on the rod 4, in Fig. XIII.

Now, as the lever 68 continues its movement from the position of Fig. XIV to that of Fig. XVI, it will be seen that the distributor ports 62, 63, are turned out of registration with their respectively associated ducts 79, 83, while lubricant is being forced through the distributor port 65 and pipe 92 into the left-hand cylinder 3 during the first-half return stroke of the piston 95 therein, as indicated by the arrow on its rod 4.

From the foregoing it will be readily seen that the lubricator pumps 32, 42 having a volume in excess of that required for one full stroke of their pistons will, of necessity, require a type of feed in which the operation of said pumps to complete their strokes is effected incrementally. Such timed or incremental movements are attained, in accordance with this invention, by means of the driving pawls 49, 52 engaging a predetermined or selected number of the ratchet teeth 50, 53 alternately and, incident to the angular movement of the lever 68, several oscillations of said lever will be requisite to effect one complete revolution of the shaft 19 and a complete throw of its cam 29, with resultant separation or dividing of the quantity of lubricant forced by the pump 32 to the proper place, at the proper time; or the forward ends of the cylinders 3 and 86. To control similar supply of lubricant to the rear ends of the cylinders 86 and 3, the pump 42 is operated with a reverse drive by opposite incremental or timed rotation of the ratchet 38, as hereinbefore explained, while the lubricant pumped and forced thereby from the reservoir 15 is similarly divided or separated to the rear ends of the cylinders 86 and 3 for the return strokes of their pistons 93 and 95. Thus the feed of lubricant to the cylinders 3 and 86 is timed and controlled by the distributor 60; while the mechanism described readily permits of variation in the feed to the cylinders, by changing the throw of the lever 68, without addition of any auxiliary means, and there is no definite positioning-relationship between the cams 29, 39 and the distributor 60. In other words, each unit pump 32, 42 and distributor 60, is distinctly individual but correlated by a common drive 22, 47.

Without further elaboration, the foregoing disclosure will so fully explain the gist of the invention that others may, by applying current knowledge, readily adapt the same for use under various conditions of service, without eliminating certain characteristic features which may be properly said constitute the essential items of novelty involved; for instance, a double-acting pump means may be substituted for the pumps 32, 42. Accordingly, the following claims are intended to include all reasonable substitutes of the particular items hereinbefore specified and are not to be limitatively construed other than as proscribed by the prior art.

Having thus described the invention, we claim:

1. A lubricating system for engines having plural cylinders, operating in phase relation, comprising an oil reservoir, plunger pumps in said reservoir for pumping oil therefrom, individual cams for actuation of the pumps, means for intermittently rotating said cams in reverse direction, and a distributor operated in common with the pumps by an oscillatable arm through connection to a reciprocating member of the engine, whereby the pump plungers are incrementally advanced to force oil into the engine cylinders from both ends during definite portions only of their respective piston strokes.

2. A lubricating system for locomotives having right and left-hand cylinders, operating in phase relation, comprising an oil reservoir, plunger pumps in said reservoir for pumping oil therefrom, individual opposedly-directed cams for actuation of the pump plungers, ratchet and holding means for incrementally turning the respective cams in selective counter-relation, and a distributor operated in common with the pumps by an oscillatable arm, through connection to a reciprocating member of the engine, whereby the pump plungers are incrementally advanced to force oil into the engine cylinders from both ends in timed relation during definite portions of their respective piston strokes.

3. The combination of claim 2 wherein the pump actuating cams embody spiralized rises respectively effective in clockwise and anti-clockwise directions.

4. The combination of claim 2 wherein the distributor consists of a rotary element operated by the oscillatable arm, and said element has arcuately elongate inner and outer ports controlling passage of the lubricating oil from the pumps through suitable connections to the front and rear ends of the engine cylinders.

5. The combination of claim 2 wherein the distributor is in the form of a ported disc rotatable in a head block having outlet ducts connected with the cylinder ends, and the distributor is closed in by a cover having branched inlet passages connected with the respective pumps.

ALBERT F. LEPPLA.
ERWIN G. MANGELS.